Dec. 15, 1970   P. N. STEVENSON   3,547,661

CONTAINER AND FOOD HEATING METHOD

Filed Oct. 7, 1968

INVENTOR.
Peter N. Stevenson
BY
Wolf, Greenfield & Hicken

United States Patent Office 3,547,661
Patented Dec. 15, 1970

3,547,661
CONTAINER AND FOOD HEATING METHOD
Peter N. Stevenson, Belmont, Mass., assignor to Teckton Inc., Waltham, Mass., a corporation of Massachusetts
Filed Oct. 7, 1968, Ser. No. 765,479
Int. Cl. A23l 3/32
U.S. Cl. 99—171
9 Claims

ABSTRACT OF THE DISCLOSURE

A container for selectively heating different items including, for example, foods within the container to different temperature levels simultaneously within an oven energized with electromagnetic energy comprising a container for the food covered with a radiation-reflecting material having apertures in opposite walls formed in the material. Food that is not to be heated is positioned within the container out of alignment with the apertures; food that is intended to be heated to a maximum temperature is aligned with apertures that permit full transmission of radiation; and food that is to be heated to an intermediate temperature is positioned in alignment with apertures that allow partial transmission of the radiation.

SUBJECT MATTER OF THE INVENTION

The present invention relates to a container for use in an electromagnetic-radiating oven for selectively heating to different temperature levels different items commonly contained within the container.

BACKGROUND OF THE INVENTION

In view of the increased popularity of microwave and infrared ovens, there is a need to provide an improved means for handling the wide variety of items including foods and industrial products that can be heated in such ovens. Because of the nature of electromagnetic radiation which energizes such ovens, it is possible to simultaneously heat such items or cook different types of foods within the oven provided the radiation is approximately reduced for foods, items or parts thereof that are not to be heated to a maximum temperature.

SUMMARY OF THE INVENTION

It is an object of the present invention to provide improved packaging for a variety of items including industrial products and foods to be heated in an electromagnetic-radiating oven.

Another object of this invention is to provide a package for use in industrial processing, including for example, the selective soldering or brazing of metal and the selective curing of plastics.

A further object of this invention is to provide an improved design for prepackaged foods that may comprise a dinner which may be stored in a freezer and for heating simultaneously in an electromagnetic oven to different temperatures.

A further object of the present invention is to provide an improved method of heating foods in a microwave oven whereby the power used in the oven is minimized and whereby successive heatings are not required for different foods.

A further object of the present invention is to provide an improved means for electromagnetically heating foods to different temperatures, using a single radiation source of uniform strength in an infrared-wave oven.

A further object of the present invention is to provide a package for use in either a microwave or infrared oven which may contain different foods for simultaneous heating to different temperatures.

In the present invention there is provided a container for use at an electromagnetic-wavelength, radiating oven for selectively heating different foods contained within the container to different temperatures wherein the container is provided with a coating of material opaque to the radiation with apertures in the material transparent or partially transparent to the radiation, and which are aligned with food that is to be heated.

BRIEF DESCRIPTION OF THE DRAWINGS

The foregoing objects and advantages of the present invention will be more clearly understood when considered in conjunction with the accompanying drawings in which.

DESCRIPTION OF THE PREFERRED EMBODIMENTS

Figure 1:
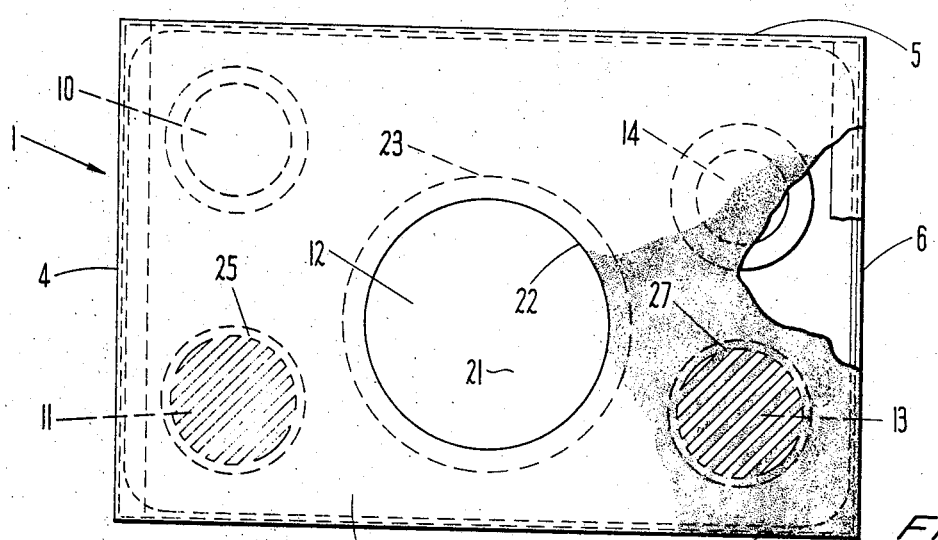
FIG. 1 illustrates a top plan, partially fragmentary view of a container embodied in the present invention.
Figure 2:
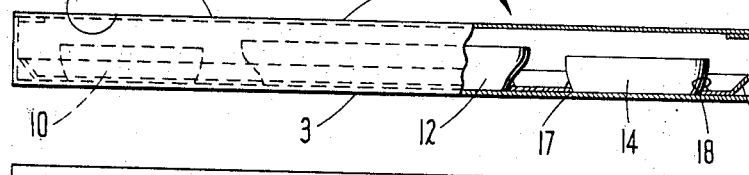
FIG. 2 is a side elevational, partially fragmentary view of the container illustrated in FIG. 1.
Figure 3:
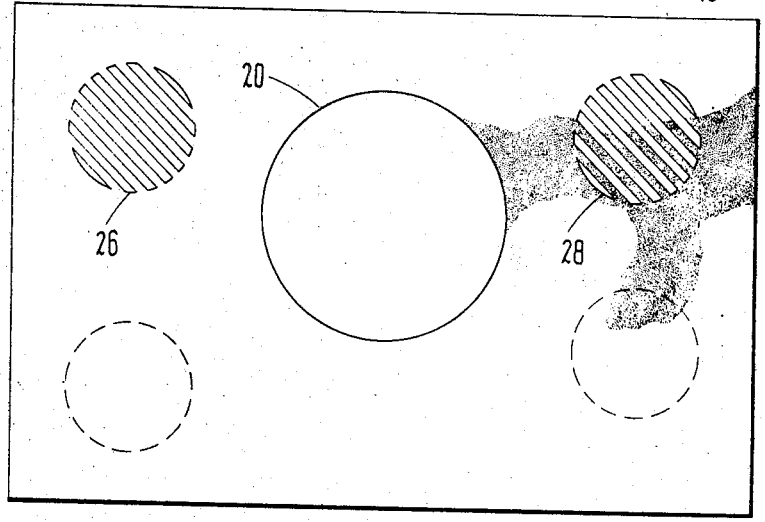
FIG. 3 is a bottom plan view of the container of FIG. 1.
Figure 4:
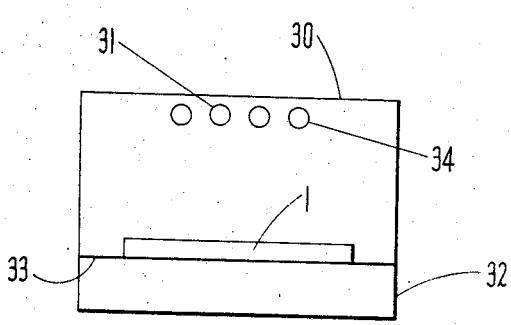
FIG. 4 is a schematic diagram illustrating a microwave oven which may, if desired, be conveyorized, as used in connection with the present invention.

The present invention will be described primarily in conjunction with a container for use in heating a complete dinner in a microwave oven. However, the invention may also be used in industrial processing for such purposes as soldering or brazing metal, the curing of plastics and other uses. In such uses the material being processed is selectively arranged in a container of the type described for selective heating in the manner in which the food products hereafter described are heated.

In this embodiment there is provided a closed container 1 having parallel top and bottom walls 2 and 3 respectively, continuously connected by the four side walls 4, 5, 6 and 7. The walls are sufficiently rigid to support their contents. These walls may comprise a box of suitable material, such as styrene, 8 having a material which is electrically conductive and opaque to microwave radiation laminated to it in selected areas. Alternately, the styrene layer 8 that forms the walls may be covered with a wrapper of transparent cellophane or other flexible, transparent plastic having a thin coating of metal, preferably aluminum, selectively deposited on either its inner or outer surfaces.

Within the container 1 is a varity of foods preferably suitably contained on dishes or bowls or the like. The food may, for example, include a bowl of prunes 10, a dish of toast 11, a main dish 12 containing meat or poultry, a dish of vegetable such as string beans 13, and a dish of a dessert such as ice cream 14. The dishes or bowls in which these various foods are contained are transparent to microwave radiation, and therefore may be composed of a suitable organic, plastic material such as polystyrene or polyethylene. In order to properly position the various bowls against movement within the package, the container may be provided with a tray 16 having a periphery that snugly fits the inner periphery of the container 1. This tray is provided with a series of holes 17 in which the various bases of the dishes or bowls are snugly received. The holes 17 each may be formed with a lip 18 about the pheriphery of the hole that projects upwardly to engage the base of a bowl or dish.

The coating 9 of metal, such as aluminum or aluminized paint, is formed with a series of aligned areas with reduced amounts of metal coatings on opposite side walls 2 and 3 in alignment with the dishes of food that are to be heated. For food that is to be heated to a maximum degree, the areas are devoid of the metal and thus form holes 20 and 21 absent of any metal. The plate of meat, for example, is therefore aligned with areas 20, 21 in the walls 2, 3 which are uniformly free of aluminum deposits. The outer periphery 22 of each of these holes or areas 20 and 21 is preferably slightly less than the periphery of the dish with which it is aligned, as illustrated at 23.

Food which is to be heated to a lesser temperature, such as the vegetable 13 and toast 11, is aligned with areas 25, 26, 27 and 28 that are translucent or only partially transparent to microwave radiation. This may be effected by providing a partial covering of metal such as aluminum over the areas 25, 26, 27 and 28. This partial covering may be effected by depositing metal, such as aluminum, over these areas in a cross-hatched pattern. If, for example, the toast and string beans are to be exposed to half the radiation of the meat, approximately half the area 25, 26, 27 and 28 should be free of aluminum. In this case, the areas may have cross-hatched lines of aluminum with intermediate spaces of equal width.

The ice cream and prunes which are not to be heated are aligned with portions of the layer 9 that are completely reflective to microwave radiation with no areas of removed metal.

Variance in mircowave transparency in the areas aligned with the dishes or bowls may be effecting in several ways. If the cover 9 is formed of an aluminum-clad, cellophane plastic, suitable cross-hatching segments and openings may be imprinted on the cellophane. If the container is painted or covered in situ with aluminum or other metal applied directly, an appropriately shaped mask may be applied to the walls 2 and 3, and the aluminum or metal applied through the mask. The microwave radiation may be controlled over a wide range by properly selecting the degree of cross-hatching or partial deposition of the metal or microwave-reflective material within the appropriate areas.

While the invention is described in connection with the use of aluminum, other electrically conductive, microwave-radiation, reflecting material may be utilized. Further, other forms of partial deposition than cross-hatching may be used, including for example a polka dot type of deposition, slots, and other configurations.

In the use of the present invention, the container 1 with a suitable variety of foods is placed within a microwave oven 30 having conventional, microwave-radiating elements 31 within the metal walls 32 of the oven. The container 1 is ordinarily placed upon a non-conductive tray or support within the oven at 33. Microwave energy is then radiated from the microwave antennas 34 and the container 1 is subjected to radiation in which only that radiation which is directed through areas that are transparent or translucent to microwave energy penetrate the container. Thus a single-strength, radiation source may be effectively used in a given period of time to provide a varying amount of radiation on the food or other materials contained within the box and, as a consequence, foods within the box will be heated to different temperatures depending upon the degree or variance in the container transparency to the microwave radiation.

The present invention also contemplates utilization of a shield having areas of varying transparency or translucency to radiation for use in microwave ovens to selectively expose a series of similar trays or containers. This arrangement is appropriate for use in commercial establishments where a plurality of different food or other products are being heated at the same time.

The present invention also contemplates a container useful for heating foods in an oven which generates radiation in the infrared wavelength of, for example, wavelengths of 1.15 to 3.1 microns. Such a container may also be useful for heating in a microwave oven. In such an arrangement the material opaque to the radiation would be opaque in the infrared spectrum. For example, the base layer 8 may be formed of a corrugated layer of Kraft paper or a layer 8 of pulp. The layer 8 is covered with a transparent cellophane or other suitable plastic. This cellophane or plastic is in turn coated with a layer of aluminum in exactly the same manner as previously described, to permit partial or full transmission of either infrared or microwave radiation.

I claim:

1. A container for use in an electromagnetic-radiating oven for selective heating of foods and the like comprising:
    a closed container having opposite parallel walls, at least said opposite walls being formed, at least in part, from material which is opaque to electromagnetic radiation;
    means forming aligned areas in said opposite walls, each of said aligned areas being adapted to pass radiation therethrough in equal amounts; and
    means for securing food intermediate said opposite walls and in substantial registry with said aligned areas.

2. A container as defined in claim 1 wherein said opaque material is of a metallic composition and wherein said areas comprise holes in said metal.

3. A container as defined in claim 2 wherein said aligned areas comprise a plurality of portions of alternately radiation-transparent and opaque material.

4. A container as defined in claim 3 wherein said container is formed of a lamination of a layer of said metallic material and a second, adjacent layer of a second material.

5. A container as defined in claim 4 wherein said second layer is a cellulose material.

6. A container as defined in claim 4 wherein said second layer is a transparent plastic layer.

7. A container as set forth in claim 1 including a wrapper of light-transmitting material to which metal is laminated.

8. A container as defined in claim 7 including a layer of cardboard having holes formed therein with said wrapper of light-transmitting material enclosing said layer of cardboard with said areas aligned with said holes.

9. A method of simultaneously heating different items to different temperatures over the same time period comprising:
    enclosing said items in a container having parallel walls, each of said parallel walls having aligned areas which are adapted to pass equal amounts of electromagnetic radiation therethrough, said items being supported in alignment with said aligned areas;
    inserting said container and items disposed therein into an enclosure having walls opaque to said radiation; and
    generating said radiation within said enclosure whereby said radiation may pass through said aligned areas in said parallel walls and through said item.

References Cited
UNITED STATES PATENTS

| | | | |
|---|---|---|---|
| 3,219,460 | 11/1965 | Brown | 99—221X |
| 3,240,610 | 3/1966 | Cease | 99—171(H) |
| 3,271,169 | 9/1966 | Baker et al. | 99—171(H)X |
| 3,302,632 | 2/1967 | Fichtner | 99—171(H)X |

TIM R. MILES, Primary Examiner

U.S. Cl. X.R.

99—221